Patented Oct. 26, 1943

2,333,072

UNITED STATES PATENT OFFICE 2,333,072

ELECTRIC STORAGE BATTERY

Lester E. Lighton, Glenside, Pa., assignor to The Electric Storage Battery Company, Philadelphia, Pa., a corporation of New Jersey No Drawing. Application February 28, 1941, Serial No. 381,081

6 Claims. (Cl. 136—65)

It is well known to those skilled in the art that in the use of storage batteries having grids consisting of an alloy of lead and antimony usually, for example, in the proportion of from 7% to 12% antimony and the balance lead, the antimony from the positive pole plate grid is deposited on the negative plate, producing a harmful effect of self-discharge in the negative. However, antimony in the positive pole plate grids serves a useful purpose in imparting mechanical strength and rigidity and in reducing the rate of electrolytic corrosion of the positive grid. Silver appears in lead as an impurity, and it was the universal belief of those engaged in the storage battery art that its presence in the lead antimony alloy of which the grid was made, was deleterious. In consequence, it was the universal practice to limit the permissible percentage of silver in the alloy. In fact, this limitation was in some cases to about a maximum of 0.01% by weight, and, in other cases, it was limited to 0.005% by weight.

The present invention is based upon the discovery that, contrary to this universal belief, the presence of silver in the grid is beneficial in respect to the elimination of the deleterious effect above referred to, and that silver imparts beneficial results if used within critical proportions.

Based upon this discovery, the invention further comprises the fact that the addition of silver permits of the reduction in the amount of antimony usually added to provide a lead antimony alloy of a certain degree of resistance to corrosion, so that a lower percentage of antimony in the lead antimony alloy and with silver added within the limits I have discovered will produce a positive plate grid having equivalent resistance to corrosion to a lead antimony alloy grid with higher percentage of antimony and containing silver, only to the extent of the limits heretofore prescribed for storage battery manufacture. This reduction in antimony in the positive grid benefits the negative plate in that there is less antimony available for deposit on it than was heretofore the case.

The principal object of the present invention is to improve the performance and to increase the life of the battery.

Other objects of the invention will appear from the following description.

It is a well-known fact that storage batteries wear out in service because of the electrolytic corrosion of the positive grid structure. This invention, by providing an alloy of lead antimony containing silver in excess of the maximum limits heretofore considered safe by the industry, produces a grid structure that is more resistant to electrolytic corrosion, and therefore increases the life of the battery. Furthermore, by reducing the amount of self-discharge occurring in the negative plate due to the deposition of antimony thereon, the amount of overcharge required to compensate for this self-discharge is reduced and the life of the positive plate further prolonged by this reduction.

This invention further comprises the improvements to be presently described and finally claimed.

Good results having been attained in practice by adding silver to the lead antimony alloy in amounts varying from about 0.04% to about 0.6% by weight.

With the addition of silver, the antimony content of the alloy may remain unchanged, in which circumstance it has been found that the resistance of the grid to corrosion has been increased and consequently the effect of antimony usually liberated from the positive grid and deposited on the negative plate is reduced. Further benefits and improvements may be obtained by reducing the antimony content of the alloy when silver is added. A lower antimony content alloy without silver would ordinarily corrode more rapidly than a higher antimony content alloy without silver. The addition of silver to the lower antimony content alloy produces at least as good resistance to corrosion as in the higher antimony content alloy without silver, with still greater benefit to the negative plate because of the reduction in the amount of antimony available for deposition on the negative. In other words, the introduction of silver in the portions specified into the positive grid reduces the rate of release of antimony from the positive grid and, furthermore, permits the use of a lower percentage of antimony in the positive grid, resulting in a fur- decrease in the release of antimony.

Considering cost and results attained, a range of from 0.1% to 0.15% of silver is, in some cases, commercially satisfactory.

In previous practice, the amount of silver in the alloy was kept below the low limits above mentioned because it was believed that a higher percentage of silver would introduce a sufficient amount of this metal into the electrolyte to cause a deposit on the negative plate and produce an increase in the self-discharge of the negative, as pointed out by Vinal in his book on storage batteries, 1930 edition, page 125.

I have found that the use of increased amounts of silver in the lead antimony alloy frequently increases the amount of silver found in, or on, the negative plate, but the harmful effect of this increase in silver on the negative is less than the harmful effect of antimony deposited on a negative plate from a grid having only the normal silver impurity in the alloy, because of the effect of the added silver in reducing the rate of corrosion of the positive grid.

By way of a further exposition of my invention reference is now made to the following results of my tests. I have found, for instance, that a standard 12% antimony lead alloy grid containing 0.0015% silver has lost 67% of its weight under certain operating conditions. By the addition of silver to a total content of 0.042%, the grid lost only 64.5% of its weight; by the addition of 0.097% silver, the grid lost 34% of its weight, and by the addition of 0.540% silver, the grid lost only 22% of its weight, all under the identical operating conditions of the standard alloy.

In another test, using 8% antimony lead alloy containing the normal silver impurity content of 0.004% silver, the grids lost 51.4% of their weight, while under identical testing conditions, the same alloy with a total silver content of 0.065% or 0.118% silver lost only 42.7% of their original weight. On still another test, where batteries were all operated under identical conditions, using 4% antimony lead alloy having 0.004% silver content, the grids lost 46.4% of their weight during the test, while similar 4% antimony lead alloy containing 0.052% silver lost 34.5% of their weight, and others containing 0.103% silver lost only 22% of their weight. Further tests have indicated that the principal gain in resistance to corrosion of lead antimony alloys using added silver in various quantities indicates that there is an improvement in resistance to corrosion beginning with the addition of about 0.04% silver and increasing rapidly to a silver content of 0.1% to 0.15% silver. Further additions to a total amount of about 0.6% silver show an additional gain in resistance to corrosion, although at a less rapid rate in proportion to the amount of silver added.

Referring to results of others of my tests, negative plates after a life test against positives having grids containing 0.0015% silver show a self-discharge, or gassing condition, that can be represented by a value of 3.5. Other negative plates tested against positives having grids with the same antimony content but with 0.042% silver show a value of 2.7 compared with 3.5; similarly, against positives having grids containing 0.097% silver and positives having grids containing 0.54% silver, both show a measure of 2.0 for self-discharge. This is important not only in reducing the loss of capacity of the negative plate on open circuit, but in reducing the evolution of explosive gas on open circuit where the battery is installed in a confined space. In this same test, it was found that the negative plate active material in the battery whose positive grids contained only 0.0015% silver, contained 0.72% antimony at the completion of the test. The negatives in the battery whose positive grids contained 0.042% silver, contained only 0.48% antimony in the negative active material; those negatives working with positive grids containing 0.097% silver contained 0.35% antimony, while negatives in the battery containing positive grids having 0.54% silver, contained only 0.33% antimony.

From the foregoing description, it is evident to those skilled in the art that this invention is not a matter of mere change in proportions. On the contrary, the change in proportions greatly improves the quality and performance of the batteries and the effect of the change in proportions was not obvious to those skilled in the art, who, on the contrary, believed that this change in proportions would be detrimental.

The described benefits apply not only to the grid proper but also to the straps and other accessories of the grid structure in cases where the invention is embodied, so that the term "grid structure" is used herein to include the straps and other accessories.

It may be remarked that, as a manufacturing economy, it is often desirable to use the same alloy in both the positive and negative grid structures.

It is further noted that the usual percentage of antimony in a lead antimony grid is from 7% to 12%; whereas, by the addition of silver, as described, the range of antimony may be reduced to as low as not more than 7%. When antimony is present in comparatively small proportions along with silver, as described, the grid is improved in mechanical strength by heat treatment.

In referring to lead or lead antimony alloy, I do not wish to exclude metals containing the usual impurities found in commercial lead or lead alloys nor the small amounts of other metals which are customarily added to battery alloys.

It will be obvious to those skilled in the art that modifications may be made in details and in matters of mere form without departing from the spirit of the invention, which is not limited as to such matters.

I claim:

1. The improvement in storage batteries, which consists in a positive pole plate grid consisting essentially of an alloy of lead, silver and antimony containing from 0.04% to 0.60% of silver, whereby corrosion of the grid is minimized, local action is reduced and the life of the battery thereby prolonged.

2. In an electric storage battery including a negative plate and a positive plate having a grid consisting essentially of an alloy of lead, silver and antimony containing from 0.04% to 0.60% of silver and from 4% to 7% of antimony, whereby corrosion of the grid is minimized and self-discharge of the negative pole plate is opposed.

3. The improvement in storage batteries, which consists in a positive grid structure consisting essentially of an alloy of lead, silver and antimony containing from 0.04% to 0.60% of silver, whereby corrosion of the grid structure is minimized, local action is reduced and the life of the battery prolonged.

4. The improvement in storage batteries, which consists in a plate grid consisting essentially of an alloy of lead, silver and antimony containing from 0.04% to 0.60% of silver.

5. The method of inhibiting corrosion of a storage battery positive grid made of an alloy of lead and antimony and of reducing self-discharge of a negative plate associated with a positive plate using said positive grid due to the release of antimony from said positive grid during operation of said plates in a battery which comprises adding to said lead-antimony grid alloy a quantity of silver varying from 0.04 to 0.6% silver by weight.

6. An alloy for storage battery grids capable of inhibiting corrosion of a positive grid and reducing self-discharge of a negative plate consisting by weight of not less than 4% or more than 7% of antimony, not less than .1% or more than .15% silver, and the balance substantially pure lead.

LESTER E. LIGHTON.

CERTIFICATE OF CORRECTION.

Patent No. 2,333,072.　　　　　　　　　　　　　October 26, 1943.

LESTER E. LIGHTON.

It is hereby certified that error appears in the printed specification of the above numbered patent requiring correction as follows: Page 1, second column, line 7, for "having" read --have--; line 34, for "fur-" read --further--; and that the said Letters Patent should be read with this correction therein that the same may conform to the record of the case in the Patent Office.

Signed and sealed this 18th day of April, A. D. 1944.

Leslie Frazer (Seal)　　　　　　　　　　　Acting Commissioner of Patents.